United States Patent [19]

Iwata et al.

[11] Patent Number: 4,596,449

[45] Date of Patent: Jun. 24, 1986

[54] ZOOM LENS APPARATUS

[75] Inventors: Hiroshi Iwata; Toshitsugu Kashihara, both of Nara; Youichi Iwai, Moriguchi; Nobuo Yamashita, Neyagawa, all of Japan

[73] Assignee: West Electric Company Ltd., Osaka, Japan

[21] Appl. No.: 560,989

[22] Filed: Dec. 13, 1983

[30] Foreign Application Priority Data

Dec. 14, 1982 [JP] Japan .................................. 57-219553
Dec. 14, 1982 [JP] Japan .................................. 57-219554

[51] Int. Cl.⁴ ............................................... G02B 7/10
[52] U.S. Cl. ..................................... 350/429; 350/255
[58] Field of Search ....................... 350/429, 430, 255

[56] References Cited

U.S. PATENT DOCUMENTS 4,318,593  3/1982  Tsuji et al. ........................ 350/430
4,448,517  5/1984  Hayashi ............................ 350/255
4,491,396  1/1985  Isobe et al. ....................... 350/429

Primary Examiner—John K. Corbin
Assistant Examiner—Loha Ben
Attorney, Agent, or Firm—Wenderoth, Lind & Ponack

[57] ABSTRACT

A zoom lens apparatus comprising a moving construction for moving a zoom-ratio adjusting barrel composed of a variator-lens amount and a compensator-lens mount by the rotation along the direction of the optical axis within the fixed barrel; a stepping motor, which is coupled to the moving construction is composed of a rotor having a hollow portion as a light path including the optical axis and a stator to be combined with the rotor, and reversibly rotates in accordance with the pulse signal to be applied; and a circuit means for controlling the operation of the stepping motor with providing advantages and that the reduction gear and clutch mechanism are not required, the outer shape is kept cylindrical, but is not required bigger in size and the price can be made lower.

7 Claims, 8 Drawing Figures

ZOOM LENS APPARATUS

BACKGROUND OF THE INVENTION

1. Field of the Invention

The present invention relates to an optical lens assembly for moving lenses for use in a photographic camera or a television camera and, more particularly, to a zoom lens apparatus with a motor for driving the zoom lens being incorporated therein.

2. Description of the Prior Art

In some conventional zoom lens apparatuses, there provide a zoom lens group composed of a variator lens and a compensator lens, and a zooming cam group having a cam groove, a transmission gear, a reduction gear and a clutch mechanism for separating the transmission between the transmission gear and the reduction gear to smoothly perform the operation, both the zoom lens group and zooming cam group being controlled by a motor through a reduction gear thereby to vary zoom ratios.

However, such a conventional zoom lens apparatus is generally referred to as a system wherein a motor for driving the lens drives the reduction gear by the rotating force of a rotary member located at the center of the rotation normally called a power rotor, and is controlled by the fed current.

Thus, when the power motor is built in within the zoom lens apparatus, the power motor, the reduction gear are so arranged around a lens barrel, which is out of the light path of the lens that the zoom lens apparatus becomes larger in its outer diameter, becomes non-cylindrical into an elliptical shape, and becomes hard to be handled. Also, as a transmission gear and a clutch are required for the reduction gear and the zooming cam group, the construction of the zoom lens apparatus becomes complicated, thus resulting in higher cost. To vary the zooming speed, the voltage to be applied upon the ends of the power motor, or resistors connected in serial are varied to control the current fed to the power motor thereby to limit the zooming speed. Accordingly, the rotating force of the motor is reduced in proportion to the current so that the rotation of the motor becomes weak enough to sometimes come to a stop in the location of that the zooming speed is slow, resulting in that the zooming speed cannot be controlled.

Also, the zoom ratio is varied by the on and off of the power-supply switch for feeding the current to the power motor, so that the zoom ratio cannot be set in advance. Therefore, it is necessary to do that the image is confirmed and judged by an optical or electric view finder to stop the zooming. Accordingly, it is not known that the zoom ratio has been stopped from what ratio to what ratio.

In addition, in a case where the camera body is secured by a tripod or the like and the zooming operation is performed by a remote controller, which allows the user to control the photographing and zooming from a remote place, the images cannot be confirmed and, thus, the condition of the images is not known, where the zoom ratio has been moved from what ratio to what ratio or how many the zoom ratio is now.

SUMMARY OF THE INVENTION

Accordingly, a primary object of the present invention is to provide a zoom lens apparatus which is free from the disadvantages of the conventional zoom lens apparatus, wherein the lens is adapted to be driven directly by a motor without a transmission gear, a reduction gear, the construction is made simpler and easier to handle without being rendered bigger in size, the price is made lower, and the zooming operation can be performed without reduction in current energy.

Another object of the present invention is to provide a zoom lens apparatus, wherein a stepping motor is used which reversibly rotates by pulse signals as a motor for driving the lens, the rotor of the stepping motor is constructed into a hollow cylindrical shape having the hollow through which the light passes the moving mechanism of the zoom lens group is coupled to the rotor so that the zoom lens group composed of a variator lens and a compensator lens, which are movably mounted on the lens barrel, may be directly driven by the rotation of the rotor of the stepping motor, and the rotation of the stepping motor is controlled by pulse signals.

A further object of the present invention is to provide a zoom lens apparatus, wherein the lens is driven directly by a stepping motor without the use of the transmission gear, the reduction gear, the entire construction is simplified without the damage of the cylindrical shape, the operation thereof can be performed with a desired zoom ratio, and the price is lower.

Still a further object of the present invention is to provide a zoom lens apparatus, wherein a stepping motor is used which reversibly rotates with pulse signals, the rotor of the stepping motor is constructed into a hollow cylindrical shape through which the light passes, the moving mechanism of the zoom lens group is coupled to the rotor so that the zoom lens group composed of a variator lens and a compensator lens, which are movably mounted on the lens barrel may be directly driven by the rotation of the rotor of the stepping motor, a zoom ratio detector is provided in the moving mechanism which finds the position of the zoom lens group to detect the zoom ratio through the mounting of the sliding contact-pieces, the zoom lens group is adapted to be moved to a position, i.e., a zoom ratio specified by a zoom ratio setter provided on the camera main-body or on the zoom lens apparatus.

According to the present invention, there provides a zoom lens apparatus wherein a first lens barrel for retaining a variator lens, a second lens barrel for retaining a compensator lens, a third lens barrel for retaining a focus adjusting lens is movably provided along its given optical axis direction within a fixed barrel to be coupled to a camera, and a zoom ratio can be varied by the movement of said first, second lens barrels, comprising a moving mechanism which is coupled to said first, second lens barrels to move said first, second lens barrels by the rotation, a stepping motor which has a hollow portion as a light path including said given optical axis, is composed of a rotor and a stator, the rotor being coupled to said moving mechanism, the stator being combined with the rotor, and is adapted to reversibly rotate by an applied pulse signal, and an electric circuit means for controlling the rotation of said rotor of said stepping motor.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
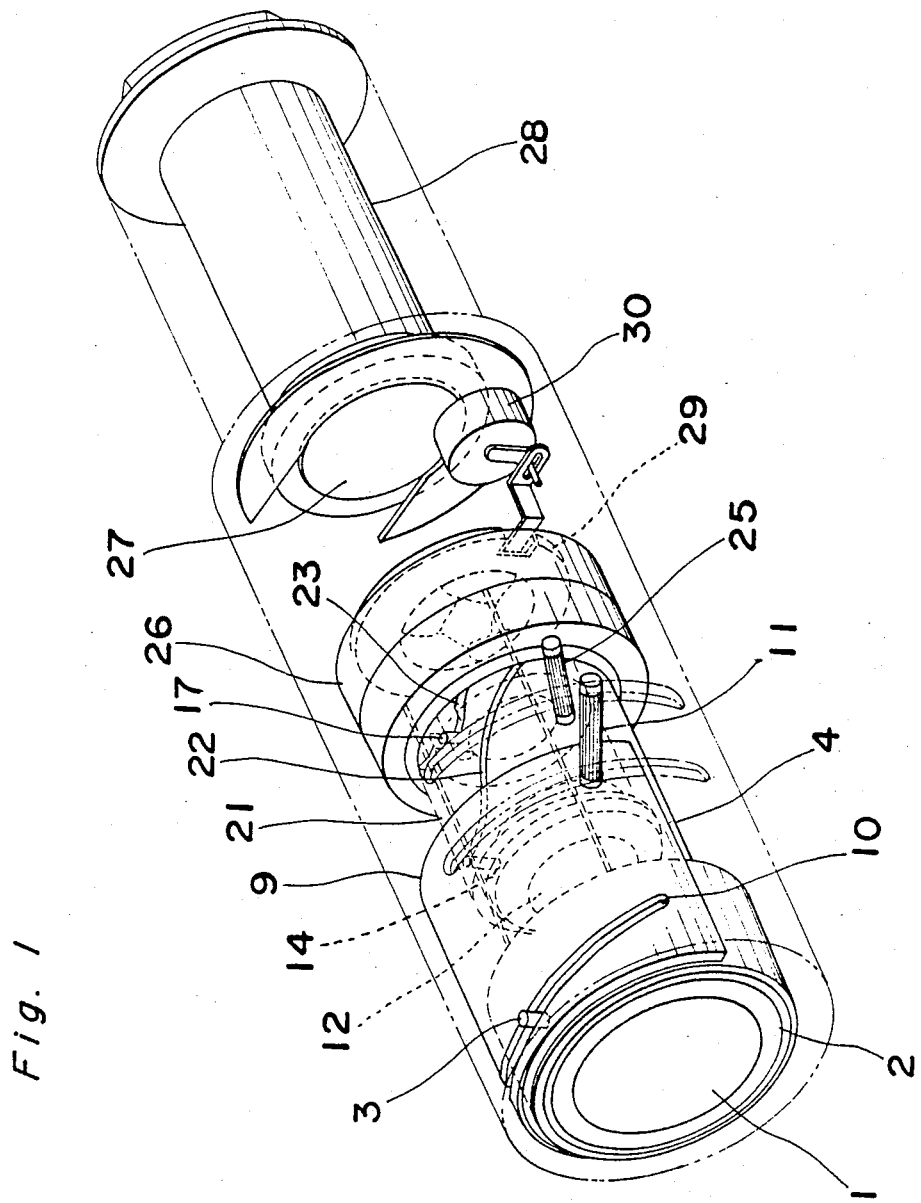
FIG. 1 is a perspective view showing one embodiment of the zoom lens apparatus of the present invention.

Before the description of the present invention proceeds, it is to be noted that like parts are designated by like reference numerals throughout the accompanying drawings.

Figure 2:
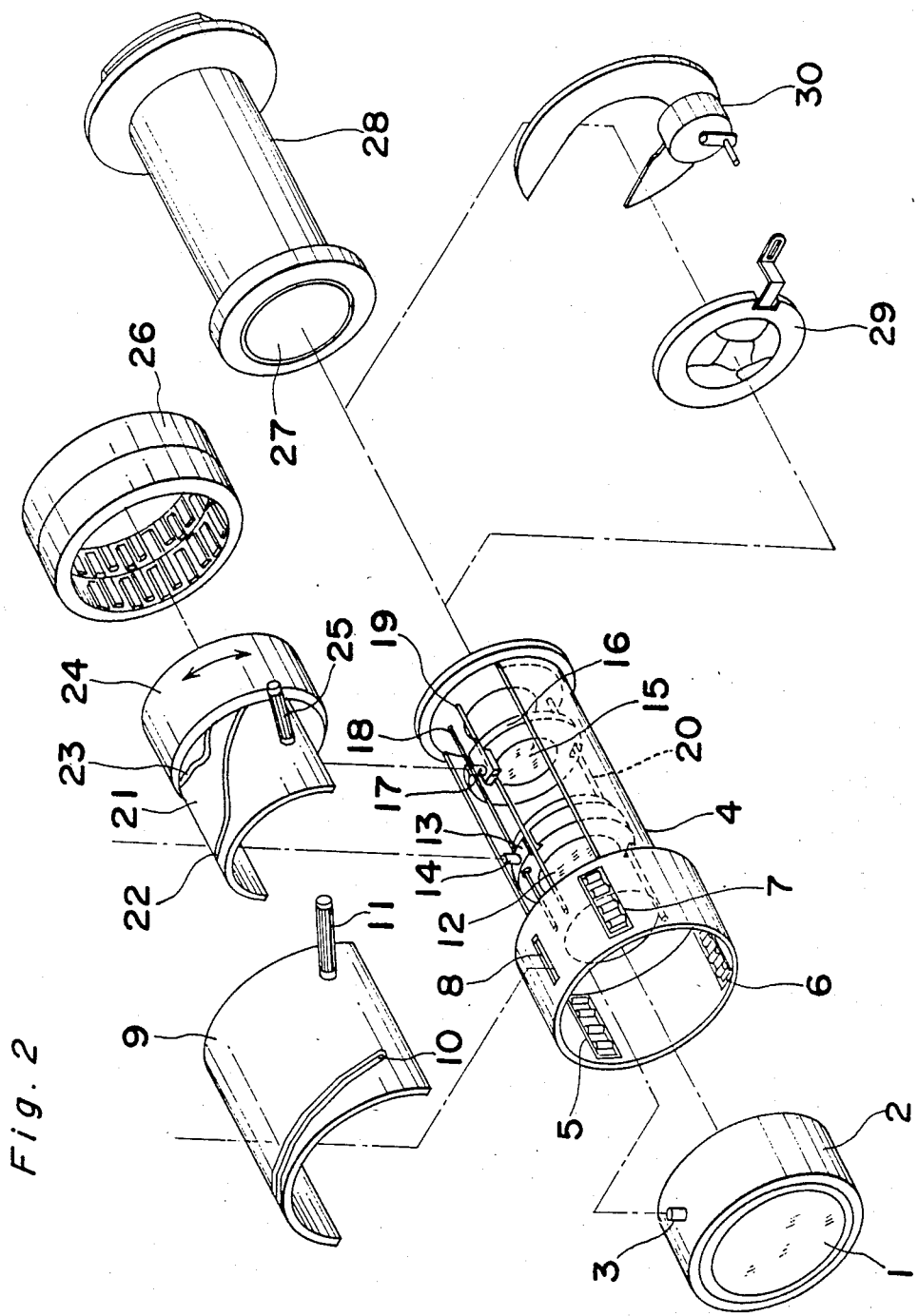
FIG. 2 is an exploded view of the zoom lens apparatus shown in FIG. 1.

Referring first to FIGS. 1 and 2, showing a zoom lens apparatus according to the present invention, which apparatus constitutes a part of an optical lens assembly having a lens casing shown by the double-dot chain line in FIG. 1, the zoom lens apparatus will be described as associated with the focusing function. In FIGS. 1 and 2, a front-group lens 1 is accommodated within a front-group lens barrel 2 made of metal, resin or the like, and the front-group lens barrel 2 has a pin 3 for movement in focus adjustment. A fixed barrel 4 is bored, not to let the optical axis of each lens step off, so that the respective lens may be engaged, with high acccuracy, into a lens accommodating place.

First, the front-group lens barrel 2 is inserted into the front portion of the fixed barrel 4 manufactured in such a construction as described hereinabove. The front portion of the fixed barrel 4 is provided, in its inner face, with horizontal bearings 5, 6, 7 to allow the movement of the front-group lens barrel 2 with low torque, and is provided with a long channel or slot 8, into which the pin 3 of the front-group lens barrel 2 is engaged.

A semi-cylindrical focus adjusting-plate 9 with the pin 3 inserted into the long channel 8 being engaged into the focus adjusting cam groove 10 is mounted above the front portion of the fixed barrel 4 with the front-group lens barrel 2 being engaged thereinto. The front-group lens barrel 2 can be moved by the motion of the radial direction of the pin by the focus adjusting knob 11 of the focus adjusting plate 9, the pin being engaged into the focus adjustment channel 10 cut into the focus adjusting plate 9. Also, the shape of the focus adjusting channel 10 can be properly determined by the delivery amount accompanied by the focus adjustment of the front-group lens barrel 2 and the motion amount of the focus adjusting plate 9 along its peripheral direction. It is to be noted that the motion construction of the front-group lens barrel 2 may be of a conventionally common helicoid construction, instead of such construction as described hereinabove.

A variator lens group 12 is accommodated within the variator lens mount 13, while a compensator lens group 15 is accommodated within the compensator lens mount 16. The zoom lens group is composed of the variator lens group 12 and the compensator lens group 15. Also, the variator lens mount 13 and the compensator lens mount 16 are provided with pins 14, 17 for movement in each zooming adjustment. The mounts 13, 16 have sliding rods 18, 19, 20 inserted therethrough so that the zoom lens group such as variator lens, the compensator lens, etc. may move without causing the optical-axis shift during the zoom ratio adjustment. Thus, the mounts 13, 16 are mounted on the fixed barrel 4. A zooming cam 21 is provided with cam channels 22, 23, which are adapted to cause the zoom lens group to perform its given motion for the zooming adjustment. The zooming cam is coupled to or integrated in construction with the rotor 24 of a stepping motor, which is composed of a stator 26 and a rotor 24 fixed on the lens frame of a camera not shown. The cam channels 22, 23 are arranged so that the pin 14 and the pin 17 may be engaged, respectively, into the cam channel 22 and the cam groove 23 as the given motion corresponding to the circumferential motion amount of the zooming cam 21 is performed on the zoom lens group. The zoom lens group is moved by the turning force of the rotor 24 of the stepping motor, i.e., the motion along the peripheral direction of the zooming cam 21 by the electric controlling to be described later, with the result that the zoom ratio is continuously adjusted.

A zoom adjusting knob 25 is used to manually move the zooming cam to adjust the zoom ratio. The illustrated zooming cam 21 is semi-circular in shape to be manufactured by a punching operation of a press type which can be performed with improving the mass production effect, as compared with a special cylindrical working machine requiring an advanced art of cutting operation. In addition, the weight of the zooming cam 21 can be reduced and the inertia moment as the stepping motor can be reduced. Accordingly, the semi-circular shape of the zooming cam 21 is advantageous as compared with the cylindrical shape.

The zooming lens apparatus of the present invention is provided with a moving mechanism, which causes each of the front-group lens 1, the variator lens group 12 and the compensator lens group 15 to act into its desired motion. All the movable lens barrels can be mounted, along the same circle-center, on the fixed barrel 4 to retain these lens groups on the same optical axis so that the mechanical positional shift caused due to the mounting of the movable unit can be extremely reduced. As the zooming cam 21 is driven directly by the rotating force of the rotor 24 of the stepping motor, a clutch mechanism is not required, which smooths the motion during the manual operation by such reduction gear and zooming adjustment knob as before. As a light path is formed within a stepping motor composed of the stator 26 and the rotor 24, the outer appearance of the zoom lens apparatus can be made so compact into a small size without any change in the cylindrical shape, that the price can be lowered due to the simplification of the mechanism.

Finally, a relay lens barrel 28 accommodated the relay lens group 27 therein is mounted on the same optical axis of the fixed barrel 4 to complete the zoom lens mechanism.

An iris adjusting mechanism 29 is driven by a servomotor 30 to adjust the exposure, which is mounted by a proper method between the compensator lens mount 16 and the relay lens barrel 28 so that the desired exposure may be adjusted.

Figure 3:
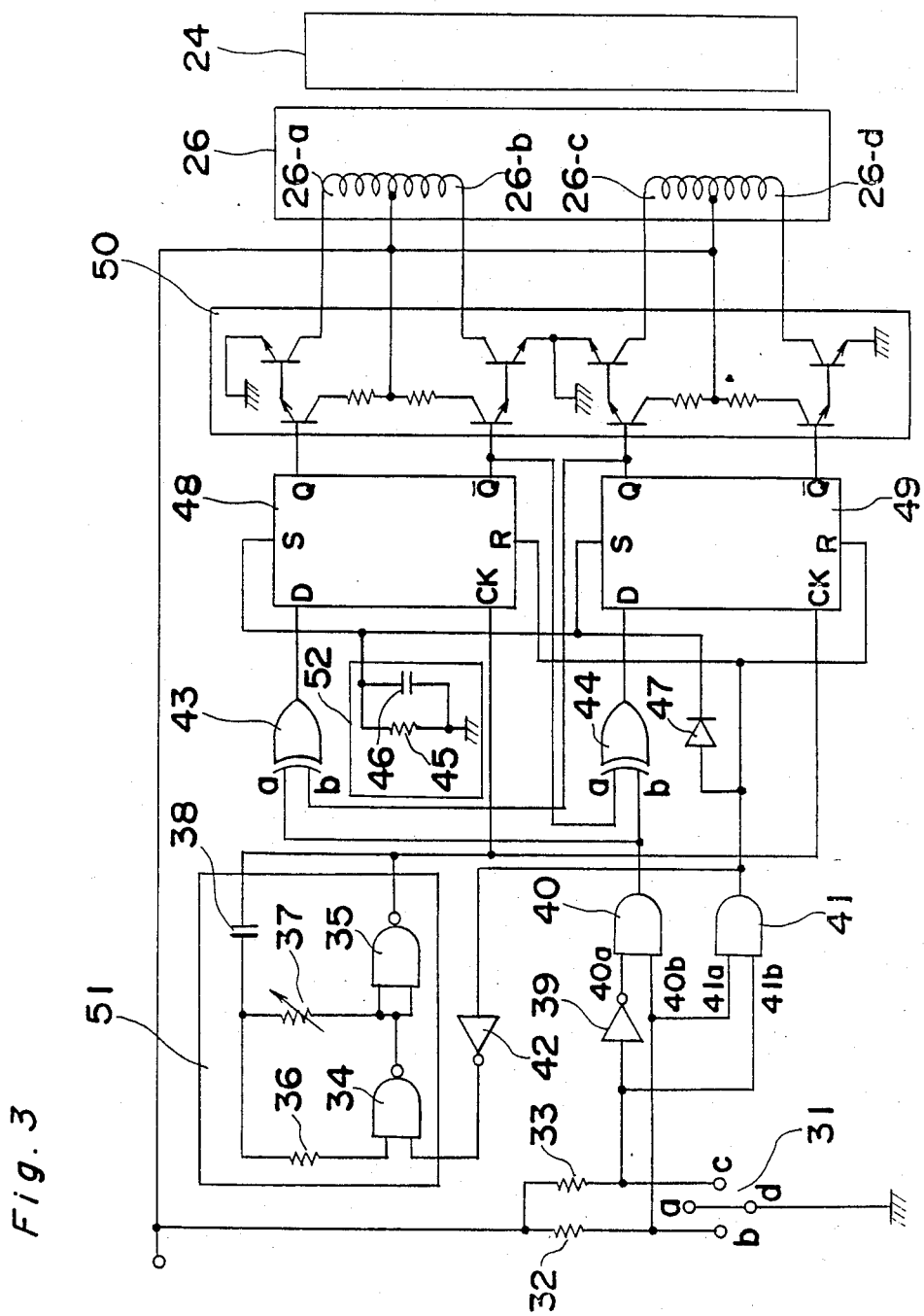
FIG. 3 is an electric circuit diagram for driving a motor for varying the zoom ratio in FIG. 1.

FIG. 3 is an electric circuit diagram, in one embodiment, for controlling the operation of a stepping motor, which drives the lens mechanism of the zoom lens apparatus shown in FIGS. 1 and 2. In FIG. 3, a switch 31 adjusts the zooming for moving the zooming lens group with providing resistors 32, 33. NAND circuits 34, 35, a resistor 36, a zooming speed adjustment volume 37, a capacitor 38 constitute an oscillation circuit 51. In the diagram, there are NOT circuit 39, AND circuits 40, 41, a NOT circuit 42, Exclusive OR circuits (hereinafter referred to as EX-OR) 43, 44, a resistor 45, a capacitor 46, and a diode 47. A time constant circuit 52 is composed of the resistor 45 and the capacitor 46. D flip-flop circuits 48, 49 (hereinafter referred to as D-FF) generates pulse signals for controlling the stepping motor (hereinafter the reference numerals 48, 49 or the like are added prior to the reference characters of the input-/output terminals, a reset terminal, a data input terminal, a clock terminal of each of the following circuit diagrams).

A stepping motor driving circuit 50, which is adapted to flow a current to each coil 26a, 26b, 26c, 26d of the stator 26 of the stepping motor, flows a current to the coil 26a when the output terminal 48Q of the D-FF 48 is a high-level signal (hereinafter referred to as H signal), to the coil 26b when the output terminal 48$\overline{Q}$ is an H signal, to the coil 26c when the output terminal 49Q of one of D-FF 49 is an H signal, to the coil 26d when the output terminal 49$\overline{Q}$ is an H signal.

The rotor 24, shown in FIG. 1, together with the stator 26, forms a stepping motor. When the rotor 24 has been rotated in its normal direction, the zoom lens group is moved in a direction along which the zoom ratio becomes smaller (hereinafter referred to as WIDE), while when it has been rotated in its reverse direction, the reverse rotation is performed so that the zoom lens group may move in a direction along which the zoom ratio becomes larger (hereinafter it is referred to as TELE).

The operation of the above-described embodiment will be described hereinafter with reference to the timing charts of FIGS. 4 and 5.

Suppose that the switch 31 is kept connected to a point of contact a, and the gate inputs 41a, 41b of the AND circuit 41 become H signals and the outputs become also H.

When the output of the AND circuit 41 becomes the H signal, the H signals are applied upon the set input terminals 48S, 49S and the reset input terminals 48R, 49R of the D-FF circuits 48, 49. The output terminals 48Q, 48$\overline{Q}$ of the D-FF circuit 48, and the output terminals 49Q, 49$\overline{Q}$ of the D-FF circuit 49 become low-level signals (hereinafter referred to as L signals) in output. When all the output terminals of the D-FF circuits 48, 49 become L signals, the current does not flow into the respective coils 26a, 26b, 26c, 26d of the stator 26 of the stepping motor as described hereinabove. Accordingly, the rotor 24 is off and the zoom lens group does not move, thus resulting in unchanged zoom ratio.

Then, change-over, connect the switch 31 to the terminal b and the L signal is applied upon the gate input terminal 41a of the AND circuit 41 and the output of the AND circuit 41 becomes the L signal. The gate input of the NOT circuit 39 is the H signal. The L signal is applied upon one gate input 40a of the AND circuit 40. The L signal is adapted to be applied upon the other gate input 40b, and the output of the AND circuit 40 becomes the L signal. The L signal is adapted to be applied upon the gate terminal a of the EX-OR circuit 43, and the gate terminal b of the EX-OR circuit 44. When the output of the AND circuit 41 becomes the L signal, the reset inputs 48R, 49R of the D-FF circuits 48, 49 become the L signal in a moment. The H signal is inputted into the set input terminals 48S, 49S during the time determined by the capacitor 46 and the resistor 45. Also, the output terminal 48Q of the D-FF circuit 48 is set into the H signal, the output terminal 48$\overline{Q}$ into the L signal, the output terminal 49Q of the D-FF circuit 49 into the H signal, the output terminal 49$\overline{Q}$ into the L signal, regardless of the condition of the data input terminals 48D, 49D and the clock input terminals 48CK, 49CK of the D-Ff circuits 48, 49.

The inputs of the set input terminals 48S, 49S are made the L signal after the time period determined by the capacitor 46 and the resistor 45.

A condition set as described hereinabove, i.e., a condition where the output terminal 48Q of the D-FF circuit 48 is the H signal, the output terminal 48$\overline{Q}$ is the L signal, the output 49Q of the D-FF circuit 49 is the H signal, the output terminal 49$\overline{Q}$ is the L signal is maintained until a rising operation signal changing into the H signal from the L signal is applied upon the clock input terminals 48CK, 49CK even after the set input terminals 48S, 49S have become the L signal.

When the output of the AND circuit 41 becomes the L signal, the output of the NOT circuit 42 is made the H signal and an oscillation circuit 51 is operated, which is composed of NAND circuits 34, 35, a resistor 36, a zooming speed adjusting volume 37, a capacitor 38 operates to perform its oscillation through a period determined by a time constant T=KRC (wherein K is constant, R is resistance value, C is capacitor capacity value) relation equation in accordance with the zooming speed adjusting volume 37, the capacitor 38.

The oscillation frequency becomes lower as the zooming speed adjusting volume 37 is made bigger from the above equation, and it becomes higher as the zooming speed adjusting volume 37 is made smaller.

Figure 4:
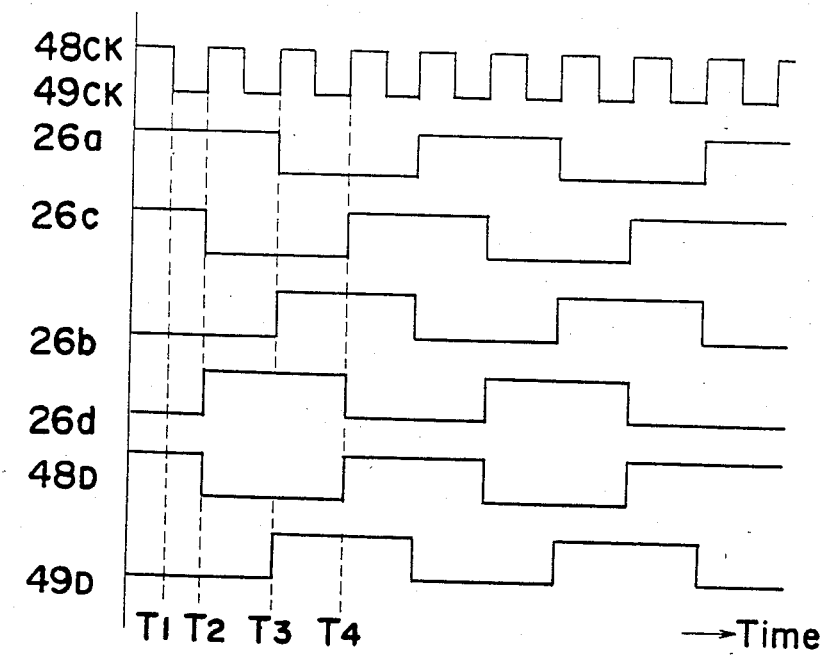
FIGS. 4 and 5 are time charts for illustrating the operation of the electric circuit shown in FIG. 3.
Figure 5:
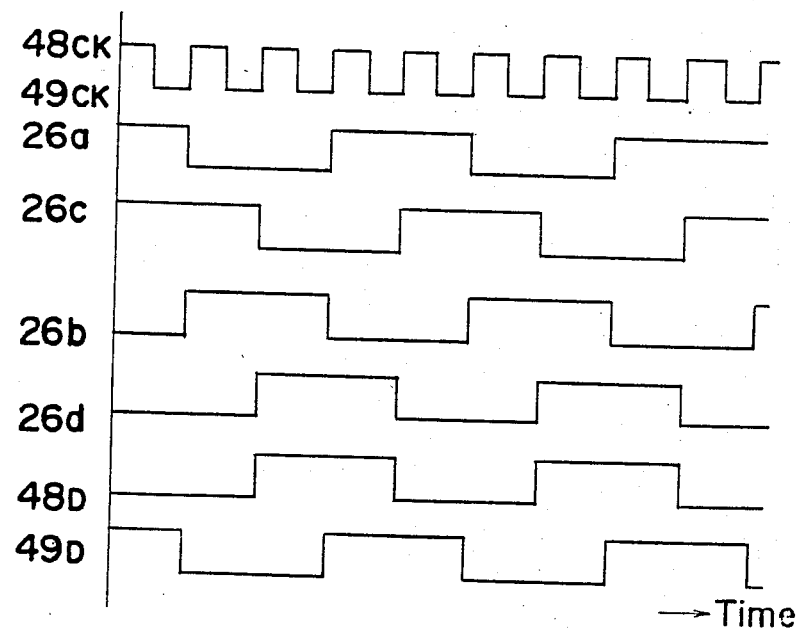

In the time T1 of FIG. 4, the H signal is applied upon the data input terminal 48D of the D-FF circuit 48, because the L signal is applied upon the gate input terminal a of the EX-OR circuit 43, and the H signal is applied upon the gate input terminal b, while the L signal is applied upon the data input terminal 49D of the D-FF circuit 49, because the L signal is applied upon the gate input terminal a of the EX-OR circuit 44, the L signal is applied upon the gate input terminal b. Then, at the T2 time of FIG. 4, the rising operation signal changing from the L signal to the H signal is applied upon the clock inputs 48CK, 49CK of the D-FF circuits 48, 49 by the oscillation circuit 51 composed of NAND circuits 34, 35, a resistor 36, a zooming speed adjusting volume 37, a capacitor 38. The output terminals 48Q, 48$\overline{Q}$ of the D-FF circuit 48 become the H signal output, the L signal output respectively as the reset input terminal 48S is the L signal, and the data input terminal 48D is the H signal. On the other hand, the output terminals 49Q, 49$\overline{Q}$ of the D-FF circuit 49 are made the L signal and the H signal in output, because the set input terminal 49S is the L signal, the reset input terminal 49R is the L signal, the data input terminal 49D is the L signal. The current flows to the coil 26a and the coil 26d of the stator 26 of the stepping motor in accordance with the output signal.

This condition is maintained until the rising operation signal changing from the L signal to the H signal is applied upon the clock input terminals 48CK, 49CK of the D-FF circuits 48, 49 at the time of T3 of FIG. 4. When the time becomes the T3 time and the rising signal is applied upon the clock input terminals 48CK, 49CK of the D-FF circuits 48, 49, the signal outputs of the output terminals 48Q, 48$\overline{Q}$ of the D-FF circuit 48 become the L signal, the H signal in output respectively, because the data input terminal 48D is the L signal. The signal outputs of the output terminals 49Q, 49$\overline{Q}$ of the D-FF circuit 49 become the L signal, the H signal in output respectively, because the data input terminal 49D is the L signal. The current flows to the coil 26b and the coil 26d of the stator 26 of the stepping motor.

When the time becomes the T4 time in FIG. 4, the rising operation signal is applied upon the clock input terminals 48CK, 49CK of the D-FF circuits 48, 49, the output terminal 48Q of the D-FF circuit 48 becomes the L signal in output, the output terminal 48$\overline{Q}$ becomes the H signal in output, the output terminal 49Q of the D-FF circuit 49 becomes the H signal in output, the output terminal 49$\overline{Q}$ thereof becomes the L signal in output to flow the current into the coil 26b and the coil 26c. The current flows to each coil of 26a through 26d, i.e., sequentially to the coils 26a and 26c, the coils 26a and 26d, the coils 26b and 26d, the coils 26b and 26c in accordance with the signals to be applied upon the clock input terminals 48CK, 49CK from the oscillation circuit 51 to rotate the rotor 24 of the stepping motor in a given direction such as the TELE direction.

Once the switch 31 is changed over and connected to the terminal C, the output of the AND circuit 40 becomes the H signal. When the H signal has been outputted to the output terminal 48Q of the D-FF circuit 48 by the setting operation and the output terminal 49Q of the D-FF circuit 49, and the L signal to the output terminal 48$\overline{Q}$ and the output terminal 49$\overline{Q}$, if the rising operation signal of the output signal from the oscillation circuit 51, in accordance with the fact that the output of the AND circuit 41 becomes the L signal as described hereinabove, is applied upon the clock input terminals 48CK, 49CK of the D-FF circuits 48, 49, the L signal is outputted to the output terminal 48Q and the output terminal 49$\overline{Q}$, and the H signal is outputted to the output terminal 48$\overline{Q}$ of the D-FF circuit 48 and the output terminal 49Q of the D-FF circuit 49. The energization is switched as shown in FIG. 5, each time the rising operation of the output signal from the oscillation circuit 51 is performed, so that the coils 26a through 26d of the stator 26 of the stepping motor are switched into the coils 26a and 26c, into the coils 26b and 26c, into the coils 26b and 26d, into the coils 26a and 26d. When the switch 31 has been connected to the terminal 31b, the current sequentially flows into an opposite direction to rotate the rotor 24 of the stepping motor in the opposite direction such as WIDE direction.

When the rotor 24 is reversibly rotated through the changing-over of the switch 31, the zooming cam 21 is reversely rotated, and the pins 14, 17 are slidably moved in the cam grooves 22, 23. Thus, the variator lens mount 13 and the compensator lens mount 16 move longitudinally so that the zoom ratio is adjusted.

The motion speed of the lens, i.e., the zooming speed can be easily adjusted only by the controlling of the frequency of the oscillation output signal of the oscillation circuit 51 through the adjustment of the zooming adjustment volume 37 without any reduction in the applied power with respect to the stepping motor. Also, the easy operation of the changing over of the switch 31 is required for the WIDE or TELE.

Furthermore, additionally provide a display apparatus (not shown in the drawings), which is coupled to these zooming operations for reading of the zoom ratio, and the zoom ratio, which is varied by the operation of the switch can be clearly confirmed at a glance so that the operation is further simplified and the correct zooming operation can be effected.

As described hereinabove, in one embodiment of the zoom lens apparatus of the present invention, described in FIG. 1 through FIG. 5, the zoom lens group can be driven and controlled directly by the rotor of the stepping motor so that the transmission, coupling members can be reduced to the utmost, and the construction can be simplified. The incidence light-path is formed within the stepping motor so that the size can be made smaller without any deformation of the cylindrical shape of the lens mechanism of the zoom lens apparatus, and the price can be made lower. As the stepping motor, whose driving source can be controlled by a pulse signal, is used, the driving operation can be driven without any reduction in the feed power to the motor. As the zooming speed can be easily adjusted only by the variation in the oscillation frequency of the output signal of the oscillation circuit, the operation can be extremely easily controlled, thus resulting in extremely high industrial value.

Figure 6:
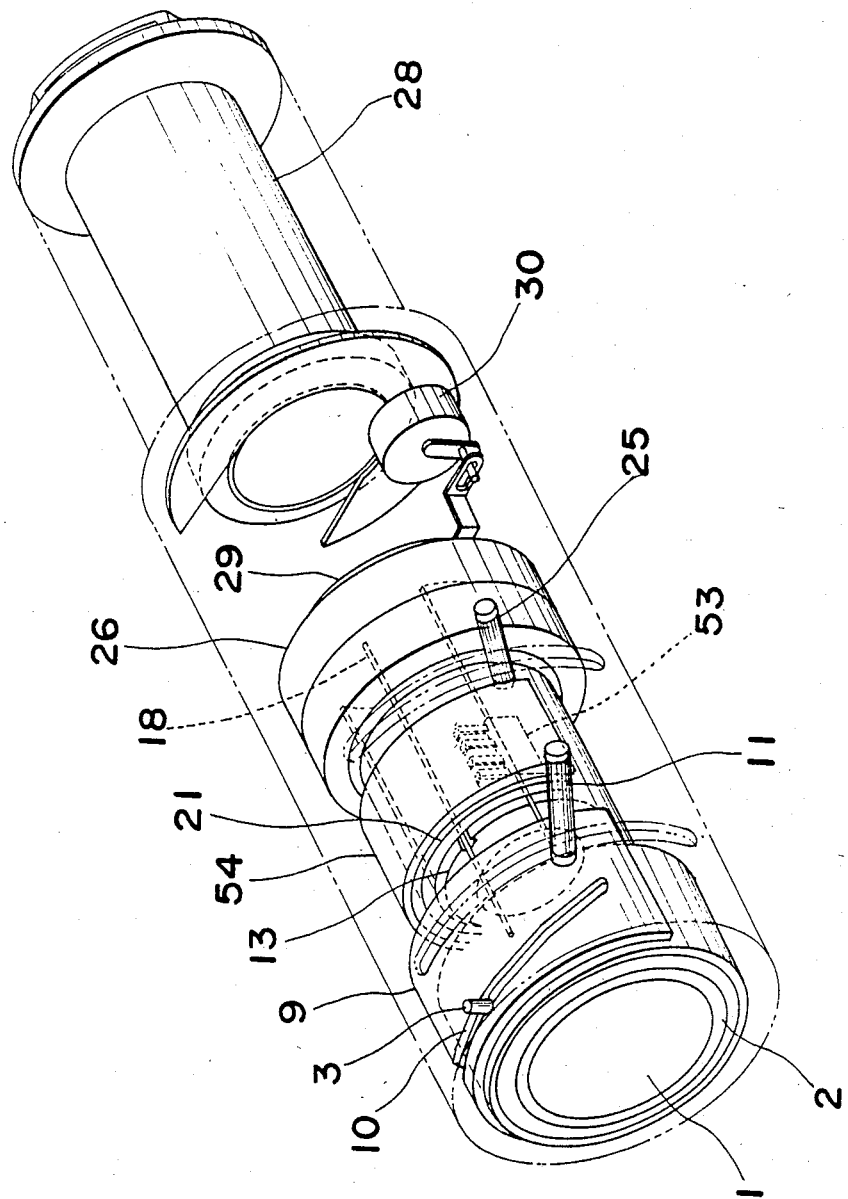
FIG. 6 is a perspective view showing the other embodiment of a zoom lens apparatus of the present invention.
Figure 7:
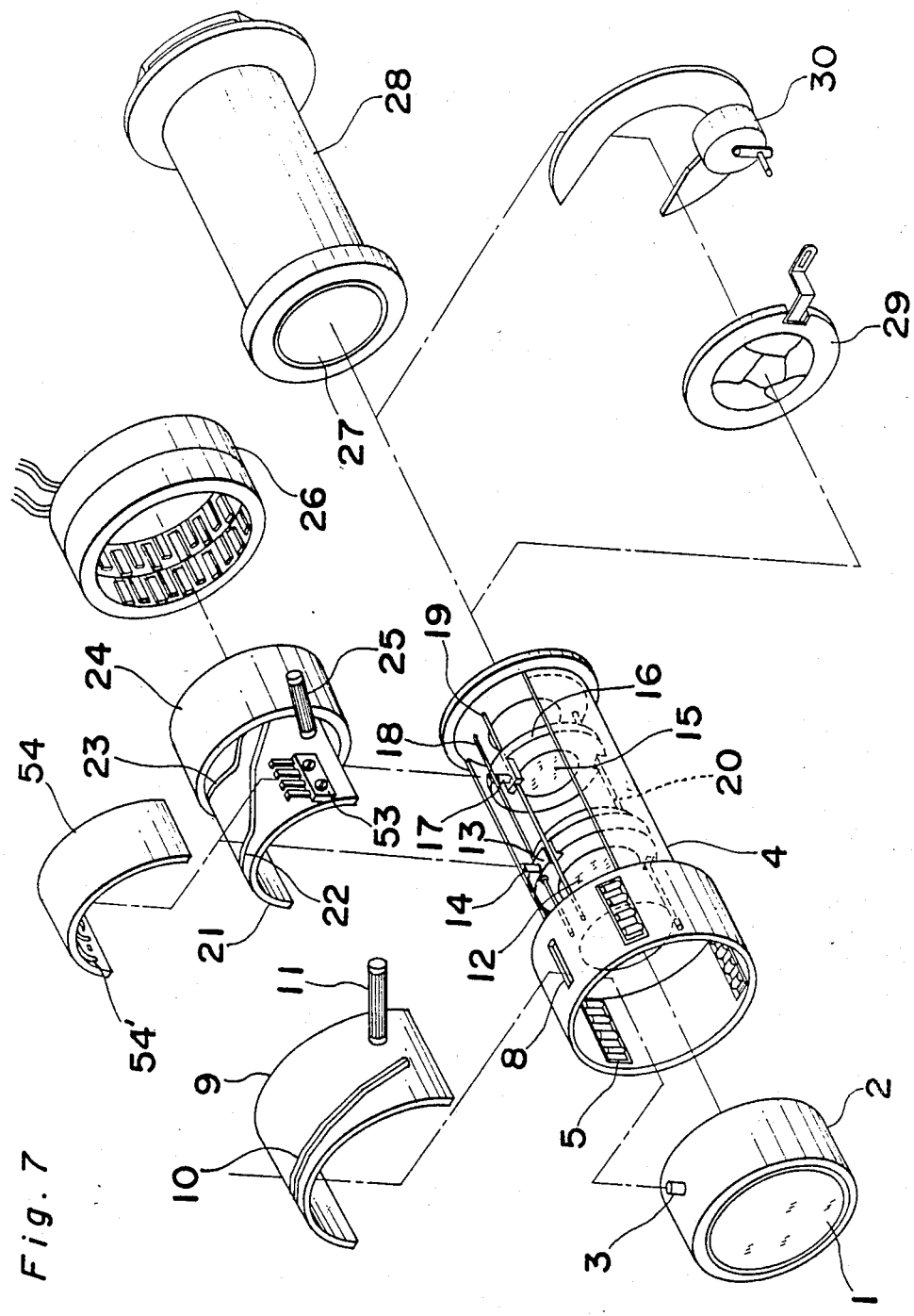
FIG. 7 is an exploded view of the zoom lens apparatus shown in FIG. 6.
Figure 8:
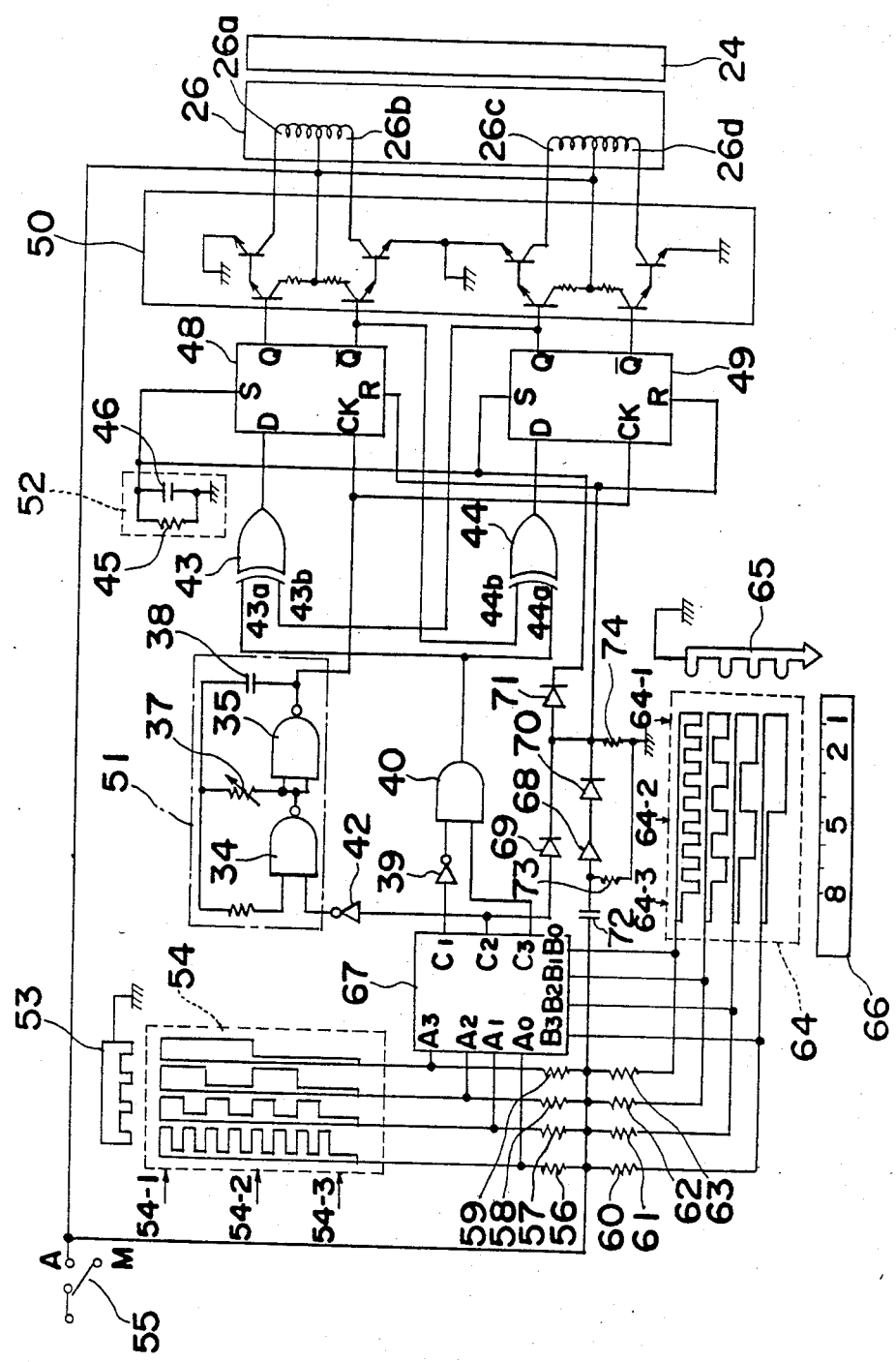
FIG. 8 is an electric circuit view for drawing a motor for varying the zoom ratio shown in FIG. 6.

FIGS. 6 to 8 show the other embodiment of a zoom lens apparatus in accordance with the present invention.

Referring to FIGS. 6 and 7, in which the same reference characters as those of FIGS. 1 and 2 show the same components, a sliding contact-piece 53 is secured on the zooming cam 21 and adapted to operatively cooperate with the zooming cam 21. A zoom ratio detector 54 is provided with a conductive pattern 54', which is secured on the fixed barrel 4 or the other fixed portion and adapted to come into contact against said sliding contact-piece 53 to detect the moving position of the zoom lens group, i.e., the zooming ratio by the contact condition.

As apparent from the drawing, the sliding contact-piece 53, the zoom ratio detect 54 are added, in the embodiment shown in FIG. 7, with respect to the embodiment shown in FIG. 2 described hereinabove.

Accordingly, the operation of the embodiment shown in FIG. 6, i.e., the focus adjusting operation, the zoom ratio adjusting operation are almost the same as that of the embodiment of FIGS. 1 and 2 and, thus, the description thereof is not given in detail. During the movement of the zoom lens group by the zooming cam 21, the signal corresponding to the position of the zoom lens group is provided from the sliding contact-piece 53 and the zoom ratio detector 54. Only this operation is different. The functions of such operations will be described with reference to the electric circuit diagram of FIG. 8.

FIG. 8 is one example of an electric circuit diagram for controlling, including the above-described additional construction, etc., the operation of the stepping motor composed of the stator 26, the rotor 24 in the embodiment shown in FIG. 6. It is to be noted that the same reference numerals, of FIG. 8, which are the same as those of FIG. 3, FIG. 7, show the same members.

Referring to FIG. 8, an automatic, manual change-over switch 55 is adapted to select the operation mode as to the automatic adjustment of the zoom ratio or the manual adjustment of the zoom ratio, there being provided with resistors 56 through 63. A zoom ratio setter 64 is disposed within the zoom lens apparatus body, or in an optional place of the camera main-body remote controller or the like. A zoom ratio-set sliding contact-piece 65 slides on the zoom ratio setter 64. A zoom-ratio display 66 is displayed by the arrow portion, at the tip end, of the zoom ratio-set sliding contact-piece 65. In the display 66, the signal outputs of the zoom-ratio setter 64 may be electrically converted so that they may be shown in places easy for viewing such as the camera finder or the like by the display elements such as LED or the like.

A magnitude comparator circuit 67 compares signals, which are outputted by the zoom-ratio detector 54 and the zoom-ratio setter 64. In the diagram, there are a buffer circuit 68, reverse-current prevention diodes 69, 70, 71. A capacitor 72, and resistors 73, 74.

The operation of the electric circuit and, more specifically the magnitude comparator circuit 67 (hereinafter referred to as M-C circuit) shown in FIG. 8 will be described hereinafter. In FIG. 8, the zoom-ratio detector signal to be determined by the shape of the conductive pattern of the zoom-ratio detector 54 and the position of the zoom-ratio detector sliding contact-piece 53 is inputted into the A0, A1, A2, A3 terminals of the M-C circuit 67.

The output signals of the zoom ratio setter 64, which are determined by the shape of the conductive pattern of the zoom ratio setter 64 and the location of the sliding contact-piece 65 of the zoom-ratio setter sliding on the conductor pattern, are inputted into the B0, B1, B2, B3 terminals of the M-C circuit 67.

The signal of the zoom ratio detector and the signal of the zoom-ratio setter by the positions of the sliding contact-piece 53 and the sliding contact-piece 65 are considered as the information signals A or B. The sliding contact-piece 53 of the zoom-ratio detector is compared in position with the sliding contact-piece 65 of the zoom-ratio setter by the M-C circuit 50, namely, the signal A of the zoom-ratio detector is compared with the signal B of the zoom ratio setter. In the A=B, the H signal is outputted to the terminal C2 of the M-C circuit 67, the L signal is outputted to the C1, C3 terminals. In the A>B, the H signal is outputted to the C1 terminal, the L signal is outputted to the C2, C3 terminals. In the A<B, the H signal is outputted to the C3 terminal, the L signal is outputted to the C1, C2 terminals.

The relationship of the signal A of the zoom-ratio detector in the position among the 54-1, 54-2, 54-3 of the sliding contact-piece 53 of the zoom-ratio comparator shown in one example of the present embodiment is 54-1<54-2<54-3. The relationship of the B signal of the zoom-ratio setter among 64-1, 64-2, 64-3 showing one example of the sliding contact-piece 65 of the zoom-ratio setter becomes 64-1<64-2<64-3. The relationship of the both is adapted to become the 54-1=64-1, 54-2=64-2, 54-3=64-3. The rotating operation will be described in detail hereinafter. When the automatic, manual change-over switch 55 is located in the position of a contact point M, the electric circuit is in its inoperative position and the zooming adjustment of the zooming lens group can be manually operated by a knob 25. Then, change over the automatic, manual change-over switch 55 into the position of the contact point A with the sliding contact-piece 65 of the zoom ratio setter being located in the position of 64-2, and the sliding contact-piece 53 of the zoom-ratio detector being located in the position 54-2, and the relationship between the signal B of the zoom-ratio setter and the signal A of the zoom-ratio detector becomes A=B. The output signal of the output terminal C2 of the M-C circuit 67 becomes the H signal in output, and the C1 terminal, the C3 terminal becomes the L signal and the L signal, respectively. The H signals are impressed upon the set input terminals 48S, 49S and 48R, 49R of the D-FF circuits 48, 49. The output terminals 48Q, 48$\overline{Q}$ of the D-FF circuit 48, the output terminals 49Q, 49$\overline{Q}$ of the D-FF circuit 49 become all the L signals in output.

When all the output terminals of the D-FF circuits 48, 49 become the L signals in output, no currents flow to each of the coils 26a, 26b, 26c, 26d of the stator 26 of the stepping motor as described hereinabove. Accordingly, the rotor 24 is in its stop position, thus resulting in unchanged zoom ratio and, at this time, the display 66 displays "5" by the sliding contact-piece 65.

Then, move the sliding contact-piece 65 of the zoom-ratio setter to the position of the 64-1, and the relationship between the signal B of the zoom-ratio setter and the signal A of the zoom-ratio detector becomes A>B. The output signal of the output terminal C1 of the M-C circuit 67 is made the H signal in output, while the C2, C3 terminals are made the L signal in output.

When the output of the output terminal C2 of the M-C circuit 67 becomes the L signal in output, the reset inputs 48R, 49R of the D-FF circuits 48, 49 become the L signal in a moment. The set input terminals 48S, 49S maintains the H signal only for a time period determined by the capacitor 46 and the resistor 45. The outputs of the D-FF circuits 48, 49 are set so that the output terminal 48Q may become the H signal output, the 48$\overline{Q}$ may become the L signal output, the 49Q may become the H signal output, the 49$\overline{Q}$ may become the L signal output, regardless of the signals of the data inputs 48D, 49D and the clock inputs 48CK, 49CK. After the time, determined by a time constant circuit 52 composed of a capacitor 46 and a resistor 45, the D-FF set input terminals 48S, 49S are made the L signals. The set condition is maintained until the rising operation signal, which changes into the L signal, is applied upon the clock inputs 48CK, 49CK even after the set inputs 48S, 49S of the D-FF circuits 48, 49 have become the L signal.

Also, the C2 terminal of the M-C circuit 67 becomes the L signal, and simultaneously the ouptut of the NOT circuit 42 is made the H signal. The oscillation circuit 51 composed of NAND circuits 34, 35, a resistor 36, a variable resistor 37 for adjusting the zooming speed, a capacitor 38 is oscillated in a period to be determined by a relation formula of a time constant=KRC (wherein K is constant, R is resistance value, C is capacitor capacity value) through the variable resistor 37, the capacitor 38. The oscillation frequency becomes lower as the resistance value of the variable resistance 37 is made larger, while it become higher as it is smaller.

Also, the output signal of the C1 terminal of the M-C circuit 67 is the H signal, the C3 terminal is the L signal, the output of the AND circuit 40 becomes the L signal. The L signal is kept inputted into the gates 43a, 44a of the EX-OR circuits 43, 44, while the H signal is kept inputted into the other gate 43b of the EX-OR circuit 43. Thus, the H signal is applied upon the data input terminal 48D of the D-FF circuit 48 and the L signal is kept inputted to the other gate 44b of the EX-OR circuit 44, and the L signal is applied upon the data input 49D of the D-FF circuit 49.

As apparent from FIG. 8, the subsequent operation after the M-C circuit 67 is the operation by the same components as those of FIG. 3. In the above-described condition, i.e., a condition where a given time to be determined by a time-constant circuit 52 has passed, the D-FF circuits 48, 49 start their operations as described even in the description of the former FIG. 3 when the first rising operation signal is applied upon the clock input terminals 48CK, 49CK of the D-FF circuits 48, 49 by the oscillation circuit 51. The respective output terminals 48Q, 48$\overline{Q}$, 49Q, 49$\overline{Q}$ of the D-FF circuits 48, 49 are adapted to output H, L, L, H signals respectively. Accordingly, the current is adapted to flow into the coils 26a, 26d of the stator 26.

Namely, in such operation condition as described hereinabove, the time chart of FIG. 4 used in the operation description of FIG. 3 can be applied as it is. The rising operation signal from the oscillation circuit 51 is adapted to be applied at the time point T2 of FIG. 4.

As described in FIGS. 3 and 4, the above-described condition is maintained as far as the T3 in FIG. 4 wherein the rising operation signal changing from the L signal to the H signal is applied upon the clock input terminals 48CK, 49CK of the D-FF circuits 48, 49. When the following rising operation signal is applied upon the clock input terminals 48CK, 49CK of the D-FF circuits 48, 49 at the time point of the T3, in the output of the D-FF circuit 48, the output terminal 48Q outputs the L signal, the output terminal 48$\overline{Q}$ outputs the H signal, because the data input terminal 48D is the L signal. On the other hand, in the output of the D-FF circuit 49, the output terminal 49Q outputs the L signal, the output terminal 49$\overline{Q}$ outputs the H signal, because the data input terminal 49D is the L signal, and, then, the current is adapted to flow to the coils 26b, 26d of the stator 26.

The D-FF circuits 48, 49 operate in accordance with the rising operation signals, from the oscillation circuit 51, to be sequentially fed at T4 in FIG. 4 or a place not represented by a reference numeral in FIG. 4. Accordingly, as apparent from FIG. 4, the current flows from the above-described condition sequentially to coils 26b and 26c, coils 26a and 26c, coils 26a and 26d. As a result, the rotor 24 of the stepping motor is adapted to be rotated in a uniform direction, i.e., the sliding contact-piece 53 of the zoom-ratio detector is adapted to be rotated to move in the 54-1 direction of the zoom-ratio detector 54.

When the sliding contact-piece 53 of the zoom-ratio detector comes to the 54-1 position of the zoom-ratio detector 54, the relationship between the signal A of the zoom-ratio detector and the signal B of the zoom-ratio setter becomes A=B. The C2 terminal of the M-C circuit 67 becomes the H signal output, the C1 terminal, C3 terminal are both the L signals in output, and each output terminal of the D-FF circuits 48, 49 becomes the L signal in output, resulting in that No currents flows to each coil of the stator 26 of the stepping motor. The rotor 24 of the stepping motor is stopped with the result that the zoom lens group could be driven at a desired zoom-ratio.

When the sliding-piece 65 of the zoom-ratio setter has been moved from the position of the above-described 64-2 into the position of the 64-3 of the conductor pattern the relationship between the signal A of the zoom-ratio detector and the signal B of the zoom-ratio setter becomes A<B. The C3 terminal of the M-C circuit 67 becomes the H signal, the C1 terminal and the C2 terminal outputs the L signal. The output of the AND circuit 40 becomes the H signal. The C2 terminal of the M-C circuit 67 is rendered the L signal from the H signal for the setting operation. Thus, the H signal, L signal, H signal, L signal are outputted into the output terminal 48Q, the output terminal 48$\overline{Q}$, the output terminal 49Q, the output terminal 49$\overline{Q}$, and, in turn, when the rising operation signal is applied upon the clock input terminals 48CK, 49CK of the D-FF circuits 48, 49, the L signal, H signal, H signal, L signal are outputted, respectively, into the output terminal 48Q of the D-FF circuit 48, the output terminal 48$\overline{Q}$ thereof, the output terminal 49Q of the D-FF terminal 49, the output terminal 49$\overline{Q}$ thereof, which is different from the above-described case wherein it was moved into the position of 64-1. Accordingly, the current flows to the coils 26b, 26c. As hereinabove described, the energization of each coil of the stator 26 is controlled for each rising operation signal of the oscillation output signals from the oscillation circuit 51. Such relationship as described hereinabove is corresponded to the timing chart of FIG. 5 used in the description of FIG. 3. As a result, the current is adapted to flow sequentially in the direction opposite to a case where the sliding contact-piece 65 of the zoom-ratio setter 64 was moved into the 64-1 position of the conductor pattern of the zoom-ratio setter 64. The rotor 24 of the stepping motor is rotated so that the sliding contact-piece 53 may move in a direction opposite to the 54-1 position of the zoom-ratio detector 54.

When the sliding contact piece 53 of the zoom-ratio detector 54 comes to the 54-3 position of the zoom-ratio detector 54 by the rotation of the rotor, the relation between the signal A of the zoom-ratio detector and the signal B of the zoom-ratio setter becomes A=B. As described hereinabove, the C2 terminal of the M-C circuit 67 becomes the H signal, the C1, C3 terminals thereof becomes both the L signals in output. Thus, each output terminal of the D-FF circuits 48, 49 is adapted to output the L signal, and the rotor 24 of the stepping motor comes to a stop. The zoom lens group can be moved to a desired ratio, i.e., to a zoom-ratio to be set in the initially changed-over position 64-3 of the sliding contact-piece 65 of the zoom-ratio setter.

The capacitor 72, the resistor 73, the buffer circuit 68 change over the automatic, manual change-over switch 55 into a contact-point A to turn the set input terminals 48S, 49S, and the reset input terminals 48R, 49R of the D-FF circuits 48, 49 immediately into the H signals through the momentary changing of the capacitor 72 when the zoom-ratio detection signal A and the zoom-ratio setting signal B are not in the relationship of the A=B to cause the setting operation to be performed.

In the embodiment shown in FIGS. 6 and 7, etc., it can be moved from the TELE direction to the WIDE direction or from the WIDE to the TELE direction, at a zooming speed specified by the volume for adjusting the zooming speed, by the stepping motor so that the zooming ratio set by the sliding contact-piece of the zooming-ratio setter, i.e., the zoom-ratio setting lever. Thus, the zoom-ratio can be optionally set.

Also, in the present embodiment, the code signal was adapted to be outputted with the zoom-ratio detector, the zoom-ratio setter as the conductor pattern. The same results are provided when the continuous signals are adapted to be outputted, with the zoom-ratio detector and the zoom-ratio setter as the resistors, for comparison by a comparator circuit.

The effect of the zoom lens apparatus in accordance with the present invention will be such that the driving operation of the zoom lens group is controlled directly by the rotor of the stepping motor to reduce to the utmost the transfer, coupling of the motor, to simplify the construction. As the zoom lens group is controlled likewise by the rotor itself, the start and stop characteristics are superior and, in turn, the light path is formed within the stepping motor to prevent the size, to the utmost, from becoming larger without any change in the cylindrical shape of the zoom lens apparatus. Thus, the zoom lens apparatus can be lowered in price.

Also, a zoom lens apparatus higher in the industrious value can be provided, which can easily adjust the speed of the zooming operation of the zooming lens by the controlling operation of the oscillation frequency of the oscillation circuit, and can drive the motor without reduction in the driving energy to the motor.

In addition, as the zoom lens group can be moved to a zoom-ratio set by an instruction display, the zoom-ratio can be confirmed, and the zoom can be set to the zoom-ratio established in advance without any confirmation of the image. Thus, it can be adjusted to a zoom-ratio optionally specified from away by the remote controller or the like.

Although the present invention has been described and illustrated in detail, it is to be clearly understood that the same is by way of illustration and example only, and is not to be taken by way of limitation, the spirit and scope of the present invention being limited only by the terms of the appended claims.

What is claim is:

1. A zoom lens apparatus wherein a first lens barrel for retaining a variator lens, a second lens barrel for retaining a compensator lens, a third lens barrel for retaining a focus adjusting lens are movably provided along a given optical axis direction within a fixed barrel to be coupled to a camera, and a zoom-ratio can be varied by the movement of said first, second lens barrels, comprising:
    a moving mechanism which is coupled to said first, second lens barrels to move said first, second lens barrels by rotation;
    a stepping motor which has a hollow portion as a light path including said given optical axis, is composed of a rotor and a stator, the rotor being coupled to said moving mechanism, the stator being combined with the rotor, and is adapted to reversibly rotate by an applied pulse signal; and
    an electric circuit means for controlling the rotation of said rotor of said stepping motor.

2. The zoom lens apparatus in accordance with claim 1, wherein the moving mechanism is composed of projected pins provided on said first, second lens barrels, a semicylindrical zooming cam which has cam grooves said projected pins are engaged into, and is engaged with said fixed barrel.

3. The zoom lens apparatus in accordance with claim 1, wherein the electric circuit means is composed of an oscillation circuit for oscillating at a given adjustable frequency to output the pulse signal of a given period, a plurality of D-FF circuits for reversing the output condition in accordance with the rising or falling of said pulse signal, a plurality of switch elements which are connected between a plurality of coils for exciting said stator and a power supply to control the energy supply into said coils to be controlled in operation by the output signal of said D-FF circuits, a direction setting means for controlling the operation timing of said plurality of D-FF circuits to determine the rotating direction of said rotor.

4. A zoom lens apparatus wherein a first lens barrel for retaining a variator lens, a second lens barrel for retaining a compensator lens, a third lens barrel for retaining a focus adjusting lens are movably provided along a given optical axis direction within a fixed barrel to be coupled to a camera such that a zoom-ratio can be varied by the movement of said first, second lens barrels, comprising:
    a moving mechanism which is coupled to said first, second lens barrels to move said first, second lens barrels by rotation;
    a stepping motor which has a hollow portion as a light path including said given optical axis, is composed of a rotor and a stator, the rotor being coupled to said moving mechanism, the stator being combined with the rotor, and is adapted to reversibly rotate by an applied pulse signal;
    a zoom-ratio setting means for outputting a zoom-ratio setting signal corresponding to a desired zoom-ratio to be set;
    a zoom-ratio detecting means for detecting a zoom-ratio in accordance with the movement of said first, second lens barrels to output the zoom-ratio signal, and a rotation controlling means for the comparison and calculation of said zoom-ratio setting signal and said zoom-ratio signal to control the rotation of the rotor of said stepping motor.

5. The zoom lens apparatus in accordance with claim 4, wherein the moving mechanism is composed of projected pins provided on said first, second lens barrels, a semicylindrical zooming cam, which has cam grooves said projected pins are engaged into and is engaged into said fixed barrel.

6. The zoom lens apparatus in accordance with claim 4, wherein the zoom-ratio setting means is composed of a zoom-ratio setter which has different conductor patterns in accordance with a plurality of different zoom-ratio setting signals, sliding contact-pieces, which come into electrically sliding contact with either of said different conductor patterns.

7. The zoom lens apparatus in accordance with claim 4, wherein a rotation controlling means comprises an oscillation circuit for performing the oscillation by a given adjustable frequency to output the pulse signal of a given period, a plurality of D-FF circuits for reversing the output condition in accordance with the rising or falling of said pulse signal, a plurality of switch elements which are connected between a plurality of coils for exciting said stator and a power supply to control the energy supply into said coils to be controlled in operation by the output signal of said D-FF circuits, a magnitude comparator for comparing said zoom-ratio setting signal with said zoom-ratio signal to be fed thereinto to output the magnitude thereof, a direction determining means for controlling the operation timing of said plurality of D-FF circuits by the output of the magnitude comparator to determine the rotating direction and stop position of said rotor.

* * * * *